July 7, 1970      D. E. PLUMB      3,519,857
STATOR ASSEMBLY FOR A DYNAMOELECTRIC MACHINE WITH MEANS FOR
ADJUSTMENT AND REMOVAL
Filed June 30, 1969      2 Sheets-Sheet 1

INVENTOR
Donald E. Plumb
BY Gordon H. Telfer
ATTORNEY

United States Patent Office 3,519,857
Patented July 7, 1970

3,519,857
STATOR ASSEMBLY FOR A DYNAMOELECTRIC MACHINE WITH MEANS FOR ADJUSTMENT AND REMOVAL
Donald E. Plumb, Williamsville, N.Y., assignor to Westinghouse Electric Corporation, Pittsburgh, Pa., a corporation of Pennsylvania
Filed June 30, 1969, Ser. No. 837,493
Int. Cl. H02k 1/18
U.S. Cl. 310—42
5 Claims

ABSTRACT OF THE DISCLOSURE

Initial axial positioning and subsequent radial adjustment and stator removal are provided in a dynamoelectric machine by a fastener arrangement between core bars and ribs or bulkheads within the frame. The fastener arrangement consists of a bolt engaged within at least one threaded hole in the core bar, a locking bushing located loosely around the bolt between the head at the bolt and the core bar and having external threads engaging an eccentric nut. The nut has different distances from its threaded aperture to different ones of its edges with a particular edge joined to one of the frame ribs. A jam nut and other locking means may be provided to prevent loosening of fastener arrangement by vibration during use.

BACKGROUND OF THE INVENTION

Field of the invention

This invention relates to stator assemblies for dynamoelectric machines.

Description of the prior art

As normally constructed, the stator of a dynamoelectric machine is secured in the frame in a manner that does not permit adjustment of its radial or axial position or removal of the stator from the frame without substantial destruction of the members. Such adjustment or removal may be desired in some instances.

Radial adjustment of the stator core to provide a more precise uniform gap between the stator and rotor would reduce danger of the rotor rubbing the stator and would reduce certain causes of noise and vibration. Some axial adjustment of the stator core could be used to compensate for end thrust. Ideally, of course, the precise centers of both the rotor and stator are at the same axial point and the motor and stator are uniformly spaced by the same close distance on each radial line. Removability of the stator from the frame may be desirable in limited instances to remove and replace a stator such as because of insulation failure requiring rewinding.

SUMMARY OF THE INVENTION

Among the objects of the invention are to provide means for adjustment or removal of stators by use of a stator-frame assembly arrangement that does not require any considerable modification of the stator core and frame from those which have been previously used but which permits the axial adjustment of the stator before a final joining operation between the stator and frame and even after such joining permits radial adjustment of the stator at various points over its surface and also permits removal at the stator from the frame and its reassembly in the same position as before removal.

Briefly, the invention involves the use of fastener means for joining core bars extending axially at the periphery of the stator core to the frame at its internal ribs or bulkheads. The fastener can include means for either radial or axial adjustment or both. For radial adjustment it includes a bolt in threaded engagement in a hole in the core bar with a locking bushing concentric with the bolt loosely fit over it and located between the head of the bolt and the core bar. The locking bushing has external threads engaging a nut having an edge fixed to one of the frame ribs. After joining the nut to the rib, as by welding, the locking bushing is adjusted in or out for the desired radial positioning and then the bolt is tightened.

The principle feature for providing axial adjustment is that the core and frame are joined by a means, such as a simple bolt or the bolt and locking bushing configuration just described, with a nut joined to the bulkhead that is an eccentric nut having different distances between its threaded aperture and some of its edges, so that by turning the nut and axial position of the core in relation to the bulkhead against which it bears can be varied up to the time that the nut is welded to he bulkhead.

The number of core bars and fasening members in accordance with this invention may be varied as desired. After assembly and use if for any reason it is desirable to remove the stator core, such removal is permitted by simply removing the bolts and loosening the locking bushing.

DESCRIPTION OF THE PREFERRED EMBODIMENTS

Figure 1:
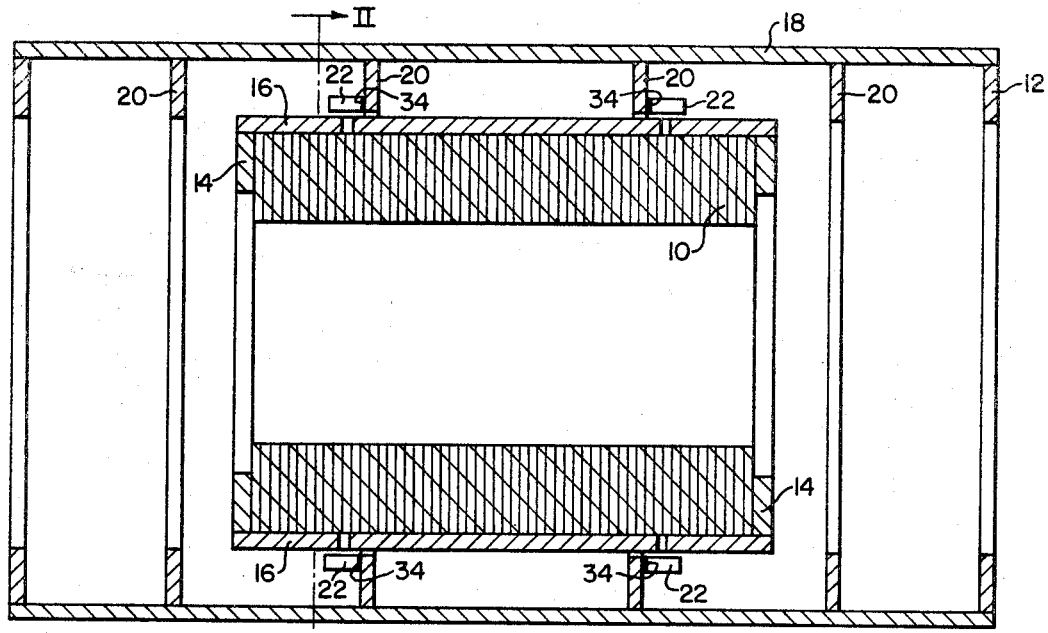
FIG. 1 is a longitudinal section of a stator-frame assembly of a dynamoelectric machine embodying the present invention.

Referring to FIG. 1, there is shown a stator core 10, such as one of a stack of punched laminations, which has a generally cylindrical configuration and is at least partially enclosed within a frame 12. At axial extremes of the stator core 10 are annular end rings 14 or other means for securing, such as by welding, the extremities of a plurality of core bars 16 that extend axially at the periphery of the core.

The frame 12 includes an axially extending shell 18 with radially inwardly extending ribs or bulkheads 20. Some conventional details of a stator-frame assembly such as windings are omitted from the drawing.

The core 10 is joined to the frame by means of fastenrs 22 (only generally outlined in FIG. 1) joined to the core bars 16 and the ribs or bulkheads 20. The view of FIG. 1 is idealized in that it assumes the presence of diametrically opposed core bars 16 with fasteners 22 at the top and bottom of the assembly.

Figure 2:
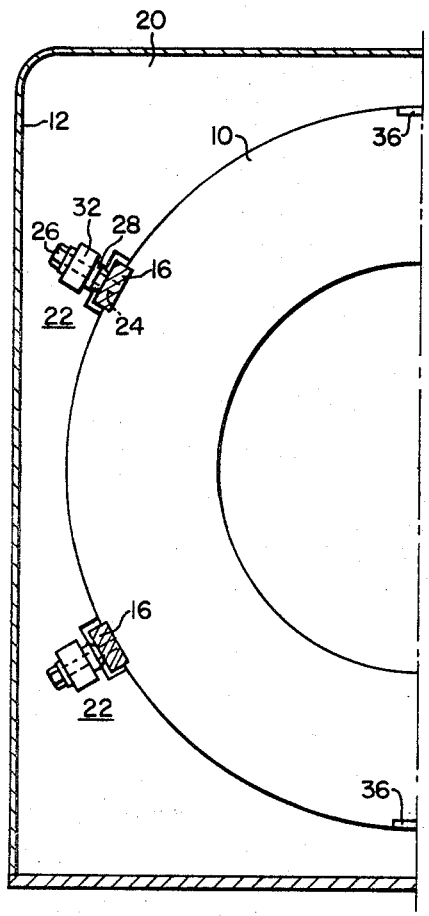
FIG. 2 is a sectional elevation view of a stator assembly in accordance with the invention roughly corresponding to a view along line II—II of FIG. 1.
Figure 4:
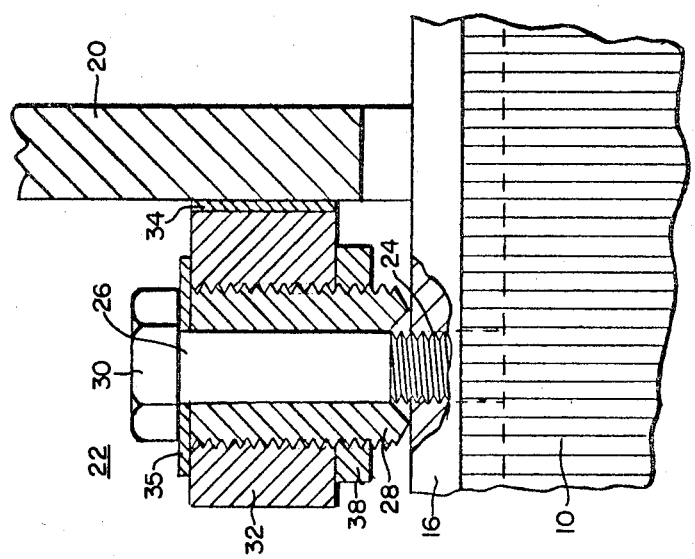
FIGS. 3 and 4 are enlarged cross-sectional views showing an assembled fastening means in accordance with this invention.
Figure 3:
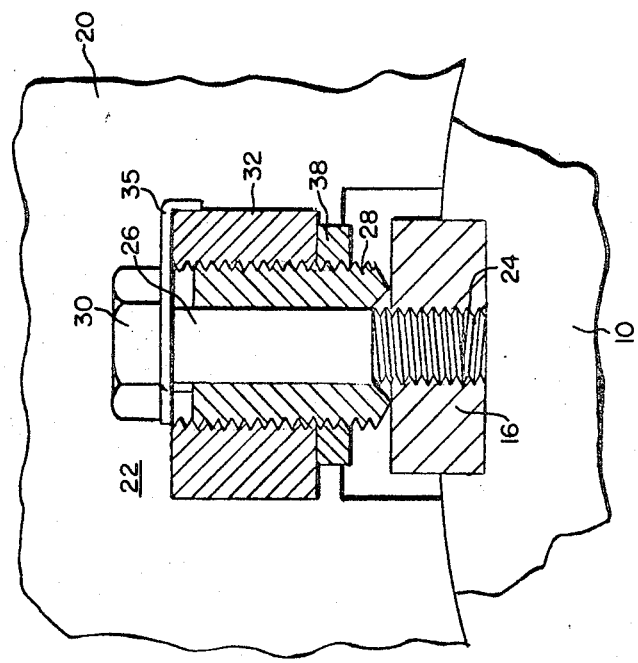

The fasteners are shown in more detail in FIGS. 2 to 4. FIG. 2 also shows the angular location of the core bars 16 and fasteners 22 as has been employed in the actual practice of the invention. Additional core bars 36 may be present without the fasteners in accordance with this invention. Otherwise FIG. 2 is a section taken along the line II—II of FIG. 1. The fasteners 22 provide means for both radial and axial adjustments as well as facilitate removal of the stator from the machine frame. The core bars 16 have threaded holes 24 receiving a bolt 26 which passes loosely through (without threaded engagement) a locking bushing 28 between the head 30 of bolt 26 and the core bar 16. On the bushing 28 is threaded a nut 32 having an edge joined, such as by welding, to one of the bulkheads 20. FIGS. 1 and 4 show the welded joint 34.

Figure 5:
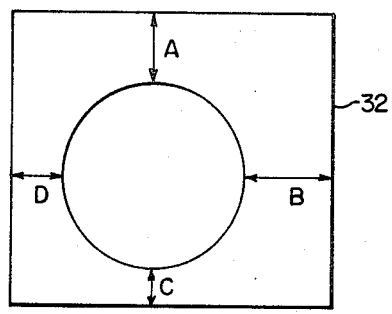
FIG. 5 is a view of part of the fastener shown in FIGS. 3 and 4.

The nut 32 is an eccentric nut as shown in FIG. 5. At least some of distances A, B, C and D from the threaded hole to the edges are unequal.

In assembly, the bolt 26 is first finger tightened. The core nut 32 is turned in the proper position to center the core axially in the frame prior to welding the edge of the nut to the rib 20.

After securing the core nut 32 to the frame, turning the core locking bushing 28 allows for radial adjustment of the core in the frame prior to tightening the bolt 26. A lock plate 35, shown in FIGS. 3 and 4, placed on the core locking bushing 28 with a flanged portion at an edge of the core nut 32 and also, in certain instances, a jam nut 38 placed on the locking bushing 28 can be used to complete the assembly.

The invention may be generally used although it can be most conveniently adapted to present stator-frame configurations of dynamoelectric machines. The nut 32 securing the core bars 16 may take various configurations although a four-sided nut as shown is convenient.

It will be apparent that features of the invention may be used to provide either axial or radial adjustment without the other. A fastener as shown, but without an eccentric nut will still permit radial adjustment and core removal. Axial adjustment can be provided using an eccentric nut with a simple bolt without the locking bushing.

Various other changes may be made without departing from the spirit and scope of the invention.

I claim as my invention:

1. A stator assembly for a dynamoelectric machine with means for adjustment or removal of the stator comprising: a stator core of a generally cylindrical configuration having axial and radial directions; a frame at least partially enclosing said core including a frame shell and at least one rib extending radially inward from said shell; a plurality of core bars extending axially at the periphery of said core; fastener means for joining said core bars and said frame comprising a bolt threadably engaged within at least one hole in each of said bars, a locking bushing concentric with said bolt without threaded engagement therewith, said locking bushing located between the head of said bolt and said core bar having external threads engaging a nut having an edge fixed to one of said ribs.

2. The subject matter of claim 1 wherein: said core bars have a pair of spaced threaded holes each engaging one of said fastener means and said frame comprises a pair of said ribs.

3. The subject matter of claim 1 wherein: said nut is an eccentric nut with non-equal distances between the threaded hole and at least some of its edges to permit axial stator adjustment before joining said nut edge and said rib.

4. A stator assembly for a dynamoelectric machine comprising: a generally cylindrical stator core; a frame at least partly enclosing said core; said frame having end rings at opposite ends of said core, a hollow shell extending between said end rings, and at least two bulkheads extending radially inward from said shell; a plurality of core bars extending axially at the periphery of said core with extremities joined to said end rings; fastener means comprising a bolt threaded into holes in said core bars and a nut threaded around said bolt and joined at an edge to one of said bulkheads; said nut being an eccentric nut having different distances from its threaded aperture and a plurality of said edges.

5. Radial adjustment means for members of a dynamoelectric machine comprising: inner and outer generally cylindrical members whose radial positioning is to be adjustably maintained; fastener means comprising a bolt threaded within said inner member; a locking bushing concentric around said bolt but not threadably engaging it, said locking bushing located between the head of said bolt and said inner member and having external threads with means thereon joined with said outer member.

References Cited

UNITED STATES PATENTS

| 2,199,351 | 4/1940 | Taylor | 310—258 |
| 2,424,299 | 7/1947 | Baudry et al. | 310—258 |
| 2,973,442 | 2/1961 | Wilson | 310—258 |
| 3,162,784 | 12/1964 | Charlin | 310—42 X |
| 3,237,035 | 2/1966 | Hoffmann | 310—258 X |
| 3,242,363 | 3/1966 | Kober | 310—258 |
| 3,375,382 | 3/1968 | Barber et al. | 310—42 X |

DONOVAN F. DUGGAN, Primary Examiner

U.S. Cl. X.R.

310—258